Patented Apr. 6, 1948

2,438,900

UNITED STATES PATENT OFFICE 2,438,900

PROCESS FOR SEPARATING BENZENE HEXACHLORIDE ISOMERS

William Herbert Cooke, Liverpool, and James Crosby Smart, Widnes, England, assignors to Imperial Chemical Industries Limited, a corporation of Great Britain No Drawing. Application April 2, 1945, Serial No. 586,260. In Great Britain April 3, 1944

13 Claims. (Cl. 260—648)

This invention relates to improvements in the production of mixtures containing benzene hexachloride, and to pest control compositions containing such mixtures.

It is known that mixtures of isomeric benzene hexachlorides can be obtained by reacting chlorine with benzene under conditions promoting addition of chlorine, but not the substitution of chlorine for hydrogen; after removing any unchanged benzene a solid mixture of isomers remains in which the α-isomer, M. P. 158° C. predominates. The β-isomer, M. P. 305° C., and the γ-isomer, M. P. 113° C., are also present. Such a mixture of isomers in which the α-isomer predominates is conveniently referred to as crude benzene hexachloride. The chlorination step may be carried out at ordinary or elevated temperature, and either discontinued while all of the isomers are still in solution in unchanged benzene, or it may be continued until solid α-benzene hexachloride separates. In either case the unchanged benzene can then be removed conveniently by contacting the slurry or solution with hot water. In the copending application of Burrage and Smart, Serial No. 537,372, filed May 25, 1944, there is described the isolation of γ-isomer or mixtures containing an enhanced proportion thereof from a crude benzene hexachloride by extracting the crude benzene hexachloride in the cold with a lower aliphatic alcohol, preferably methanol or ethanol. The α-isomer has but a small solubility in the lower aliphatic alcohol compared with the γ-isomer, and thus a separation can be effected.

We have now found that for other aliphatic compounds, and for cycloaliphatic compounds containing 6-carbon atom rings, which are solvents for the benzene hexachlorides, similar solubility relationships exists between the γ-isomer and the α-isomer, so that by extracting the additive chlorination product of benzene with such a solvent, after removing unchanged benzene, it is possible to produce a solution of isomeric benzene hexachlorides containing an enhanced proportion of γ-isomer to α-isomer.

According to the present invention, therefore, a process for treating crude benzene hexachloride to obtain a mixture of isomers containing an enhanced proportion of the γ-isomer comprises extracting it with an aliphatic solvent therefor (other than a lower aliphatic alcohol), or with a cycloaliphatic solvent therefor containing a 6-carbon atom ring, such an amount of solvent being employed as to dissolve γ-isomer and leave a substantial proportion of the α-isomer undissolved.

Advantageously the amount of the solvent used to carry out the extraction is not significantly greater than that required to dissolve substantially all of the γ-isomer. However, if the presence of some α-isomer is not objectionable, rather more of the solvent may be used and a corresponding proportion of the α-isomer will then be present in the extract together with the γ-isomer. Some β-isomer may also be present in solution. However, the amount of β-isomer in the crude benzene hexachloride is small, and this isomer has a lower solubility than the α-isomer in all the solvents which we have tried; on both accounts, therefore, the amount of β-isomer in the extract containing the γ-isomer will be small. Minor proportions of chlorinated benzene hexachlorides, for example monochlorobenzene hexachloride, may be formed during the initial chlorination and these will then also be present in the solution, for they appear to have a greater solubility in most solvents than the γ-isomer.

Suitable compounds which may be used as solvents for carrying out the extraction include normally liquid chlorinated hydrocarbons such as chloroform, carbon tetrachloride, cis-dichloroethylene, trans-dichloroethylene, trichloroethylene, perchloroethylene, and ethylene dichloride; esters such as methyl acetate, methyl propionate, methyl dichloroacetate, ethyl acetate, n-butyl acetate, diethyl carbonate; normally liquid hydrocarbons such as heavy naphtha, odourless distillate, kerosene, and petrol ether. Other aliphatic solvents which may be used include diacetone alcohol, dimethyl acetal, carbon disulphide, ethyl ether, acetone, and glacial acetic acid. Cycloaliphatic solvents containing 6-carbon atom rings which may be used include cyclohexane, cyclohexene, cyclohexanol, cyclohexanone, and decahydronaphthalene.

The following table indicates the solubilities of the α-isomer and the γ-isomer in these solvents at a temperature of 20° C. The solubilities are given as the number of parts of α or γ-isomer, respectively, present in 100 parts by weight of a saturated solution containing only the one isomer.

| Solvent | Solubility of— | |
|---|---|---|
| | α-isomer | γ-isomer |
| Chlorinated aliphatic hydrocarbons: | | |
| chloroform | 6.31 | 23.98 |
| carbon tetrachloride | 1.89 | 6.70 |
| cis-dichloroethylene | 6.40 | 20.77 |
| trans-dichloroethylene | 6.77 | 22.45 |
| ethylidene chloride | 5.67 | 20.16 |
| perchloroethylene | 2.39 | 7.37 |
| ethylene dichloride | 7.85 | 28.91 |
| trichloroethylene | 3.67 | 14.70 |
| isobutyl chloride | 4.33 | 14.94 |
| Esters of aliphatic carboxylic acids: | | |
| methyl acetate | 13.64 | 27.72 |
| ethyl acetate | 12.72 | 35.74 |
| n-butyl acetate | 10.82 | 31.54 |
| methyl trichloroacetate | 3.91 | 13.16 |
| methyl propionate | 12.96 | 37.75 |
| Cycloaliphatic solvents with a 6-carbon atom ring: | | |
| cyclohexane | 1.42 | 4.60 |
| cyclohexene | 5.46 | 17.40 |
| cyclohexanol | 1.92 | 4.59 |
| cyclohexanone | 17.26 | 36.66 |
| decahydronaphthalene | 2.50 | 8.70 |
| Aliphatic hydrocarbons: | | |
| Diesel oil | 1.53 | 4.13 |
| heavy naphtha | 5.84 | 18.10 |
| odourless distillate | 0.77 | 2.04 |
| kerosene ("paraffin") | 1.18 | 3.15 |
| n-pentane | 0.85 | 2.17 |
| petrol ether | | |
| B. P. 40° C. to 60° C | 0.70 | 2.08 |
| B. P. 100° C. to 120° C | 1.27 | 3.50 |
| "white oil" | 0.65 | 1.90 |
| Miscellaneous aliphatic solvents: | | |
| glacial acetic acid | 4.24 | 10.24 |
| acetone | 13.86 | 43.46 |
| acetonitrile | 5.52 | 26.41 |
| n-butyl bromide | 4.58 | 16.17 |
| diacetone alcohol | 5.35 | 20.97 |
| dimethyl acetal | 14.31 | 38.70 |
| ethyl ether | 6.19 | 20.77 |
| paraldehyde | 3.06 | 10.00 |

The amount of solvent selected to carry out the extraction in any form of the invention will depend on the solubility of the γ-isomer in that particular solvent at the temperature of extraction. The minimum will in any case be that which gives a mixture of solution and undissolved material from which it is practicable to separate the former, and this corresponds to approximately equal bulks of solvent and crude benzene hexachloride, although for the liquids with a low solvent power for the benzene hexachloride isomers it may be preferable to use at least 1.5 times this amount. Subject to this restriction the most advantageous amount of solvent will be the minimum which will dissolve all of the γ-isomer, and can be found by trial in any particular case. For practical purposes, when carrying out extraction in the cold with a solvent in the table above, an approximation to a suitable amount of solvent can be deduced by calculating, from the γ-solubility figure, the minimum of solvent necessary to dissolve all the γ present in a given amount of a mixture of isomers. It is understood, however, that the amounts of solvent to use, as given by this method, are approximate, and indeed the proportion of solvent to benzene hexachloride is not extremely critical. Nevertheless this method gives an indication of an amount of solvent which will give, for practical purposes, a useful result. Thus in extracting 100 parts by weight of crude benzene hexachloride containing 12% γ-isomer with trichloroethylene, 70 parts of solvent would be suitable, with decahydronaphthalene 125 parts would be appropriate, and with cyclohexane 250 parts. If the volume of the solvent selected in this way is less than the bulk occupied by 100 parts by weight of benzene hexachloride, it will be necessary in practice to use a greater amount, and only a product containing some α-isomer in addition to the γ-isomer can be obtained. If the volume of the solvent so selected is greater than the bulk of the 100 parts of benzene hexachloride, less or more than this amount can also be used, and a product containing a correspondingly smaller or greater amount of α-isomer will result. Thus in the case of carbon disulphide and glacial acetic acid, rather more than this minimum amount can be used without dissolving large amounts of α-isomer. On these considerations it will be advantageous to employ a solvent not capable of dissolving more than approximately 12 grms. of γ-benzene hexachloride in 100 mls. of solvent.

If it is desired to use a solvent with a greater solvent power than this the latter property may be diminished by the addition of a second liquid miscible therewith which has at most a low solvent power for the benzene hexachloride isomers. Thus, glacial acetic acid may be diluted with up to 15% by weight of water, and acetone with up to 25% by weight of water. Similarly the chlorinated hydrocarbon solvents and the carboxylic ester solvents may be diluted with small amounts of a pentane or a petrol ether fraction.

It appears that, at least in some cases, the presence of the γ-isomer in solution depresses the solubility of the α-isomer. It is then possible, by suitably selecting the proportion of solvent to benzene hexachloride, to obtain an extract containing a much greater ratio of γ-isomer to α-isomer than is indicated by consideration of the solubilities of the pure isomers in the solvent.

For many hydrocarbon solvents the absolute solubilities are so low that they are not convenient to use in practice. On the contrary, some of those having but small solvent power may be used not only to depress the solvent power of more powerful solvents as described above, but also to precipitate at least a part of the dissolved material from solutions of benzene hexachloride in such solvents after carrying out the extraction with the latter. Thus petrol ether may be used to effect precipitation, or partial precipitation, of benzene hexachlorides from a concentrated solution thereof in heavy naphtha or methanol.

In one method of carrying out our invention benzene is chlorinated under conditions which produce benzene hexachloride; suitably, chlorine is passed into a quantity of cold or warm benzene irradiated by sunlight, or the light from a mercury arc lamp. Chlorination is continued until a 15% to 20% solution of the isomeric benzene hexachlorides in benzene is produced, though if desired, the chlorination may be carried further so that a slurry of benzene hexachloride results. The solution or slurry is then gradually added to a quantity of hot water, for example water at 75° C. to 80° C., so that unchanged benzene is evaporated off, and the mixture of isomeric benzene hexachlorides is precipitated. This mixture is then dried in an air oven or otherwise, and roughly ground in any suitable manner. Such a product contains approximately 8% to 12% of the γ-isomer. The ground material is then extracted in the cold with the selected cycloaliphatic or aliphatic solvent which may be, for example, trichloroethylene, cyclohexane or decahydronaphthalene. The extraction may be carried out by stirring the solvent with the benzene hexachloride for a suitable time, for example for 1 to 2 hours. The resultant solution is then separated from undissolved material by filtration, decantation or analogous method.

If desired, when a relatively volatile solvent is used, the solvent may be evaporated off from the extract so obtained to give a solid containing the γ-isomer. Solids may also be recovered by fractional crystallisation or fractional precipitation methods, whereby two or more fractions may be obtained containing more or less of the γ-isomer than the solid obtained by evaporating off all the solvent. Thus a glacial acetic acid extract may be treated with water to precipitate all or part of the benzene hexachloride in solution, and extracts obtained using carbon tetrachloride, chloroform, trichloroethylene or perchloroethylene may be similarly treated with a pentane, or a petrol ether fraction.

Other methods of carrying out the invention may be used. Thus when a solvent is chosen in which the solubilities of the benzene hexachlorides are relatively high, for example chloroform or acetone, a solution may be made of the whole of the material in such an amount of hot solvent that the solution would be supersaturated in the cold, and the solution cooled so that a substantial amount of benzene hexachloride, which will be mainly the α-isomer, separates. After removing this solid a solution will then remain containing a mixture of isomers with a ratio of γ to α enhanced to an extent depending on the proportion of solvent taken.

Again, before carrying out the extraction, the crude benzene hexachloride may be washed with a liquid which has a low solubility for the γ-isomer, such as petrol ether, in amount sufficient to remove the chlorinated benzene hexachlorides without dissolving any substantial amount of γ-isomer. An extract will then be obtained which is free from these impurities. This may be advantageous, for example, if it is desired to recover γ-isomer from the extract by fractional crystallisation, for these impurities mar the clean separation and crystalline nature of the fraction deposited from solution. Other liquids which may be used for this purpose instead of petrol ether include n-pentane, odourless distillate, ethylene glycol, and acetic acid containing 15% to 20% of water.

If desired, the crude benzene hexachloride may, before treating it with a solvent, be submitted to a deodorising treatment; thus it may be boiled with concentrated nitric acid as is described in copending British application No. 19,477/43, treated with nascent hydrogen as described in copending British application No. 3,434/45, or with silica gel or absorbent carbon as described in copending British applications Nos. 18,571/44, 3,437/45, and 3,438/45. Such preliminary treatment is very conveniently applied when the solvent extract containing the γ-isomer is to be used in the production of sprays by dilution with another solvent or with further quantities of the same solvent as described below.

The extract obtained by any of the methods above described, or the mixture of isomers obtained from it which contain an enhanced proportion of the γ-isomer, as compared with the original material, may be employed in the production of pest control compositions as described in copending British application No. 10,459/42. Sprays suitable for pest control purposes may also be obtained by diluting the solution, obtained by extracting the crude benzene hexachloride with solvent according to this invention, with further quantities of the same solvent or with another solvent miscible therewith. Thus, for example, the extraction may be carried out by means of decahydronaphthalene and the solvent extract can be diluted with heavy naphtha or kerosene to provide sprays suitable for controlling flies or mosquitoes.

The following examples illustrate but do not limit the invention, all parts being parts by weight:

Example 1

Benzene was chlorinated by passing chlorine into it at 50° C. while irradiating it with a mercury arc lamp. When the amount of chlorine reacted corresponded to the formation of a 20% solution of benzene hexachlorides in benzene, chlorination was stopped and the solution was added gradually to hot water so as to evaporate off the benzene. The mixture of benzene hexachlorides remaining was filtered off, dried, and ground. The product contained approximately 12% γ-benzene hexachloride.

100 parts of the ground product were stirred for a time in the cold with 312 parts of cyclohexane, and the solution was filtered. It contained 18 parts of solids, of which approximately 12 parts were γ-benzene hexachloride. By evaporating off the cyclohexane from the solution, 18 parts of solids could thus be obtained containing 66% of γ-benzene hexachloride.

Example 2

Ground benzene hexachloride, obtained as in Example 1, was submitted to a deodorising treatment by contacting it with coarse silica gel for some hours, and then removing the silica gel by sieving. This method is described and claimed in copending British application No. 19,477/43. 100 parts of the deodorised material were stirred with 120 parts of decahydronaphthalene and the solution was filtered. The solution contained 18 parts of solids of which 11.4 parts were γ-benzene hexachloride. By diluting the solution with 20 times its volume of kerosene a liquid was obtained suitable for use as a fly spray.

Example 3

100 parts of ground benzene hexachloride, obtained as in Example 1, were stirred in the cold with 60 parts of heavy naphtha and the solution was filtered. The solution contained 32.5 parts of solids, of which 12 parts were γ-isomer.

Example 4

60 parts of the ground benzene hexachloride obtained as in Example 1 were stirred for a time in the cold with 30 parts of trichloroethylene, and the solution filtered. It contained 15 parts of solids, of which approximately a third was estimated to be γ-benzene hexachloride. By evaporating off the trichloroethylene from the solution, 15 parts of solids could thus be obtained containing approximately 33% of γ-benzene hexachloride.

Example 5

400 parts of ground benzene hexachloride, obtained as in Example 1, were refluxed with 3000 parts of chloroform and the solution was filtered. Chloroform was boiled off from the solution until a solution was left which was sufficiently concentrated to deposit 310 parts of solids on cooling to room temperature. The solution was then cooled so that this solid was deposited, and the mother liquor was filtered off. The solution contained substantially all of the γ-benzene hexachloride present in the original material.

Example 6

60 parts of ground benzene hexachloride, obtained as in Example 1, were stirred in the cold with 45 parts of glacial acetic acid, and the solution filtered. The solution contained 23 parts of solids, of which 5 parts were γ-isomer. By diluting the glacial acetic acid solution with a large volume of water the solids in solution were precipitated; they were then filtered off, and dried to give a material containing 21% γ-benzene hexachloride.

Example 7

200 parts of crude benzene hexachloride, obtained as in Example 1, containing 12% of γ-isomer were stirred for an hour at room temperature with 100 parts of methyl acetate. The resultant slurry was filtered and 130 parts of filtrate were obtained. On evaporating the filtrate to dryness 57 parts of solid were obtained containing 42% of γ-benzene hexachloride.

It will be apparent from the foregoing description that the process of our invention can be carried out using a very varied range of solvents, all of which are aliphatic compounds (other than lower aliphatic alcohols) or cycloaliphatic compounds containing a 6-carbon atom ring. In the following claims these solvents are referred to as "selective solvents," since they have the power of selectively recovering γ-benzene hexachloride from the crude benzene hexachloride.

We claim:

1. A process for treating crude benzene hexachloride to obtain a mixture of isomers containing an enhanced proportion of the γ-isomer, which comprises extracting the crude benzene hexachloride with an amount of a selective solvent taken from the class consisting of aliphatic hydrocarbons, chlorinated aliphatic hydrocarbons, and cycloaliphatic hydrocarbons having a 6-carbon atom ring sufficient to dissolve γ-isomer and leave a substantial proportion of the α-isomer undissolved, and separating the solid α-isomer from the γ-isomer-enriched solution.

2. A process according to claim 1 in which the selective solvent is a normally liquid chlorinated aliphatic hydrocarbon.

3. A process according to claim 1 in which the selective solvent is decahydronaphthalene.

4. A process for treating crude benzene hexachloride to obtain a mixture of isomers containing an enhanced proportion of the γ-isomer which comprises agitating the crude benzene hexachloride in the cold with a selective solvent taken from the class consisting of aliphatic hydrocarbons, chlorinated aliphatic hydrocarbons, and cycloaliphatic hydrocarbons having a 6-carbon atom ring in amount sufficient to form a slurry containing the α-isomer in the solid state, and separating the liquid phase from the solid.

5. A process according to claim 4 in which the selective solvent is a normally liquid chlorinated aliphatic hydrocarbon.

6. A process according to claim 4 in which the selective solvent is decahydronaphthalene.

7. A process for treating the additive chlorination product of benzene to obtain a mixture of isomers containing an enhanced proportion of the γ-isomer, which comprises the steps of removing unchanged benzene therefrom, and agitating the crude residue in the cold with a selective solvent taken from the class consisting of aliphatic hydrocarbons, chlorinated aliphatic hydrocarbons, and cycloaliphatic hydrocarbons having a 6-carbon atom ring in amount sufficient to dissolve γ-isomer and to give a slurry containing solid α-benzene hexachloride, and separating the liquid phase from the solid.

8. A process according to claim 7 in which the selective solvent is a normally liquid chlorinated aliphatic hydrocarbon.

9. A process according to claim 7 in which the selective solvent is decahydronaphthalene.

10. A process for treating the additive chlorination product of benzene to obtain a mixture of isomers containing an enhanced proportion of the γ-isomer which comprises the steps of removing unchanged benzene therefrom, and agitating the crude residue in the cold with a selective solvent taken from the class consisting of aliphatic hydrocarbons, chlorinated aliphatic hydrocarbons, and cycloaliphatic hydrocarbons having a 6-carbon atom ring in amount not significantly greater than that required to dissolve substantially all of the γ-benzene hexachloride and enable the resultant solution to be separated from undissolved solid, and separating the liquid phase from the solid.

11. A process for treating crude benzene hexachloride to obtain a mixture of isomers containing an enhanced proportion of the γ-isomer, which comprises extracting the crude benzene hexachloride with an amount of a selective solvent completely miscible with a second selective solvent in which said γ-isomer is less soluble than in said first solvent sufficient to dissolve γ-isomer and leave a substantial proportion of the α-isomer undissolved, separating the extract from undissolved α-benzene hexachloride adding an amount of said second solvent sufficient to precipitate solid from said solution, and isolating the precipitate.

12. A process according to claim 11 in which the first selective solvent is a normally liquid chlorinated aliphatic hydrocarbon.

13. A process according to claim 11 in which the first selective solvent is decahydronaphthalene.

WILLIAM HERBERT COOKE.
JAMES CROSBY SMART.

REFERENCES CITED

The following references are of record in the file of this patent:

FOREIGN PATENTS

| Number | Country | Date |
| --- | --- | --- |
| 447,058 | Great Britain | May 7, 1936 |

Certificate of Correction

Patent No. 2,438,900.  April 6, 1948.

WILLIAM HERBERT COOKE ET AL.

It is hereby certified that errors appear in the printed specification of the above numbered patent requiring correction as follows: Column 3, line 8, in the table, first column thereof, under the heading "Solvent", for "Chlorinated alipathic hydrocarbons" read *Chlorinated aliphatic hydrocarbons*; line 15, for "Esters of alipathic carboxylic acids" read *Esters of aliphatic carboxylic acids*; and that the said Letters Patent should be read with these corrections therein that the same may conform to the record of the case in the Patent Office.

Signed and sealed this 15th day of June, A. D. 1948.

[SEAL]

THOMAS F. MURPHY,
*Assistant Commissioner of Patents.*